United States Patent [19]

Ladin

[11] 4,132,105
[45] Jan. 2, 1979

[54] METHOD OF MAKING A LOCKING COLLAR FOR AN ANTIFRICTION BEARING ASSEMBLY

[75] Inventor: Eli M. Ladin, Ann Arbor, Mich.

[73] Assignee: Federal-Mogul Corporation, Detroit, Mich.

[21] Appl. No.: 841,508

[22] Filed: Oct. 12, 1977

[51] Int. Cl.² .................................... B21D 22/00
[52] U.S. Cl. ................................ 72/356; 29/520; 308/DIG. 11
[58] Field of Search ............... 72/352, 356, 148.5 R, 72/367; 29/511, 520; 308/DIG. 11

[56] References Cited

U.S. PATENT DOCUMENTS

| 905,998 | 12/1908 | Dorff | 29/520 X |
|---|---|---|---|
| 2,174,337 | 9/1939 | Welsmiller et al. | 29/520 UX |
| 3,441,293 | 4/1969 | Bagnulo | 29/511 X |
| 3,699,637 | 10/1972 | Posiek | 29/520 UX |

*Primary Examiner*—Leon Gilden
*Attorney, Agent, or Firm*—Robert F. Hess

[57] ABSTRACT

A method of forming an internal conical surface on the counterbore of an annular antifriction-bearing locking collar is disclosed which comprises the steps of providing one end of the collar with a counterbore having a circumferential side wall, and deforming relative to the axis of the counterbore at least a portion of the periphery of the counterbore by forcing a corresponding portion of the circumferential side wall of the counterbore generally radially inwardly to thereby form the internal conical surface on the counterbore.

10 Claims, 9 Drawing Figures

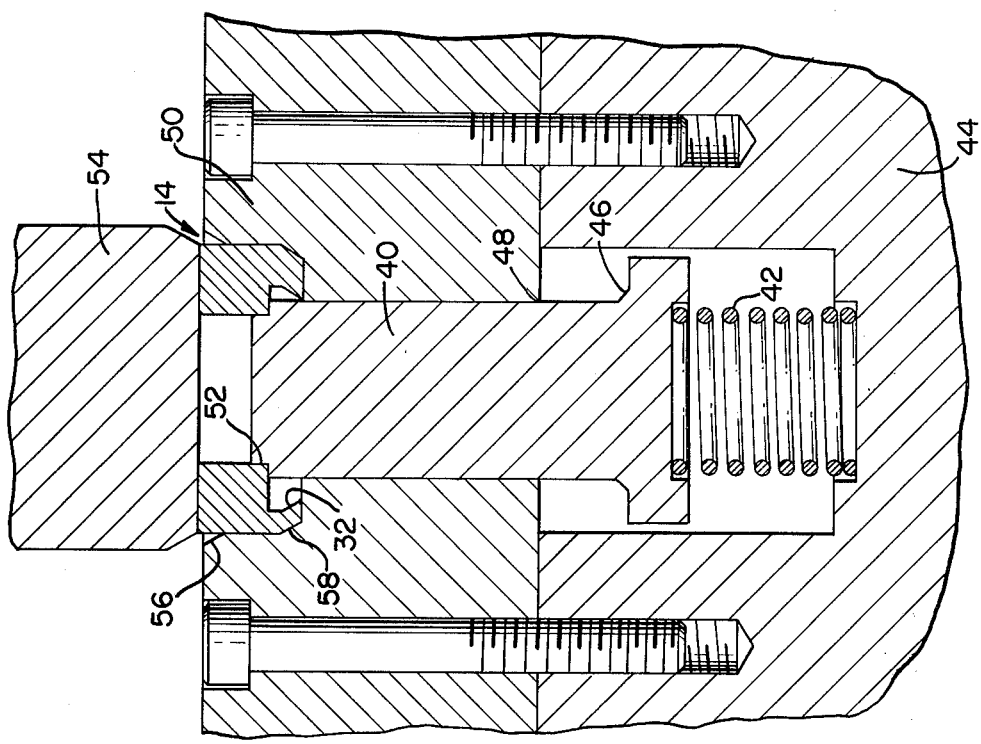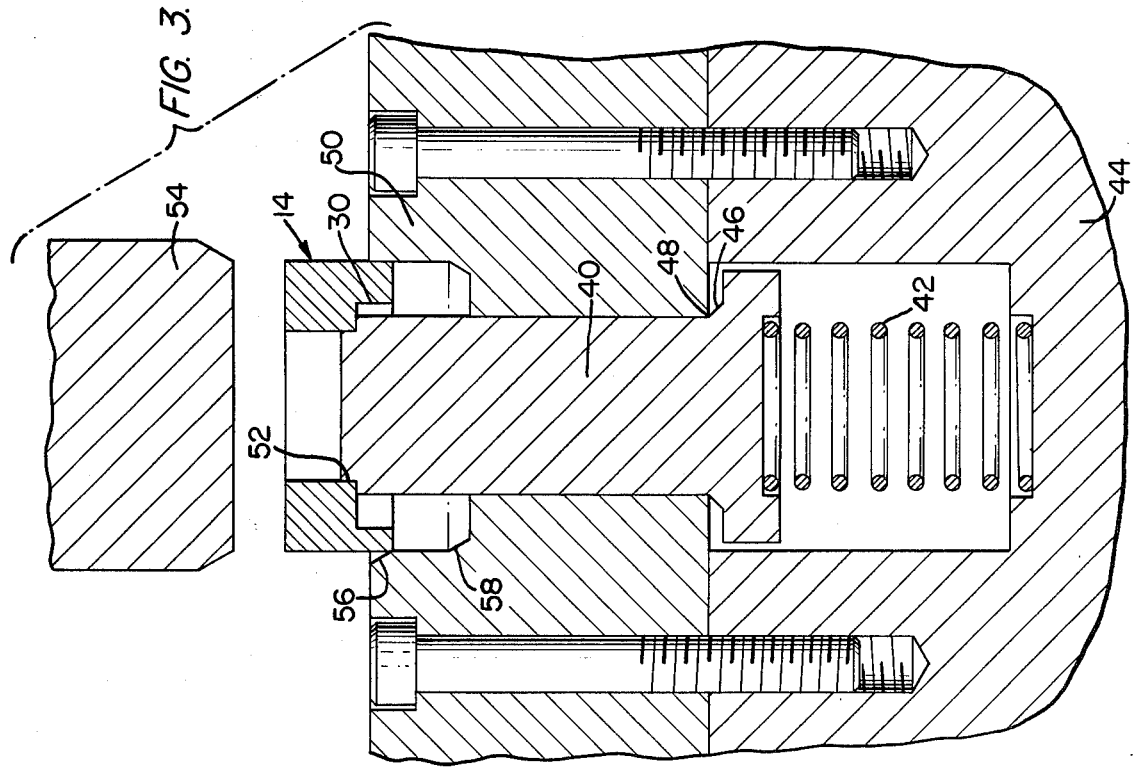

METHOD OF MAKING A LOCKING COLLAR FOR AN ANTIFRICTION BEARING ASSEMBLY

BACKGROUND OF THE INVENTION

A. Field of the Invention

This particular invention is directed to a method of forming a locking collar of the type adapted for locking the inner ring of an antifriction bearing assembly to a shaft. More specifically, it is related to a method of deforming the periphery of the side wall forming a formed counterbore radially inwardly to thereby form an internal conical locking surface.

B. Description of the Prior Art

In most antifriction bearing applications, the bearing assembly is mounted in a stationary housing by a press fit. A shaft is inserted into the bore of the bearing for rotational support with minimal friction. Due to axial and radial loads on the shaft, however, the relative axial and radial position of shaft and bearing will change. For most modern applications, this is an undesirable situation since the relative position of shaft and bearing assembly must be maintained within very close limits both radially and axially. Therefore, it has become common to lock the inner ring of the bearing and the rotation shaft together. In many cases, a press fit locks the ring and bearing together. In many installations, however, a press fit is not practical when, for instance, a long shaft is supported in the middle by a bearing. A press fit by the very nature of the forces required is almost impossible to accomplish over a span of more than a few inches. As a result, many shafts are mounted in bearings with a slip fit or even a loose fit. In such cases, locking the two members together is generally accomplished by either a set screw, a locking nut, or a locking collar, and it is generally accepted in the art that the most satisfactory locking mechanism for long shaft applications is the locking collar.

The mating conical surfaces of the locking collar and the inner ring are important because it is this feature that keeps the two parts from axially separating when the parts are in the locking position on a shaft. As can be appreciated, tolerances between the interfitting components are critical. The usual practice has been to machine the external eccentric cone on the extension of the inner bearing ring and the mating eccentric internal conical surface was then machined as an eccentric of the counterbore of the locking collar.

Previously forgings, bars, or tube stock were used as the raw material from which to make the locking collar. The actual forming, however, was done by machining with considerable loss of stock as scrap where metal was removed. Machining was chosen as the practical method to produce the part because of the difficulty of making a reverse cone or conical surface on the inside of the eccentric counterbore by any other method.

The forming of a normal internal cone in which the outboard diameter is larger than the inboard diameter is taught in the prior art, as described in U.S. Pat. No. 3,531,970 which was assigned to the assignee of the present application. U.S. Pat. No. 3,531,970 teaches a method of forging external races, known as cups, for tapered roller bearings. The same general technique may be followed for producing the ring with a counterbore in the present invention. However, the particular method described by the foregoing patent does not teach a final forming operation which is as simple, reliable and inexpensive as that of the present invention.

U.S. Pat. Nos. 2,728,616 and 3,239,292 disclose typical locking collar constructions. That of Potter, U.S. Pat. No. 2,728,616, is perhaps the most popular general design in use in the industry. In both patents, however, the basic conical surfaces are machined as aforesaid with considerable cost in time, labor, and material.

SUMMARY OF THE INVENTION

It is an object of the present invention to overcome the disadvantages as aforenoted by a novel and improved method. Broadly, in accordance with the principles of this invention, there is disclosed a method of forming an internal conical surface on the counterbore of an antifriction-bearing locking collar comprising the steps of forming an annular body with a counterbore having a circumferential side wall on one end thereof, and deforming at least a portion of the periphery of the counterbore by forcing the circumferential side wall of the counterbore generally radially inwardly to thereby form the internal conical surface on the counterbore.

In one particular mode, a steel billet is first forged into a preform of a predetermined size in a blanking operation. A first punching operation then expands the slug into a ring. A second punching operation, using the hole in the ring as a guide, produces an eccentric counterbore on one side of the ring. A final form punching operation then upsets the metal around the counterbore to produce a reverse, generally conical surface which is eccentric to the bore and concentric with the counterbore. The reverse cone refers to the configuration where the conical surface is smaller in diameter at the outboard end than it is at the inboard end.

BRIEF DESCRIPTION OF THE DRAWINGS

The above and other objects, features and advantages of the present invention will become readily apparent after reading a detailed description thereof when viewed in conjunction with the accompanying drawings wherein like reference numerals indicate like structure throughout the several views.

FIG. 2 (b) is a cross-sectional view with perspective as in FIG. 2 (a) after forging the internal conical surface;

FIG. 3 is a cross-sectional view of the locking collar of FIG. 2 (a) positioned on a die prior to forging the internal conical surface;

FIG. 4 is a cross-sectional view as in FIG. 3 after the die is closed, forging the locking collar as shown in FIG. 2(b);

DETAILED DESCRIPTION OF THE PREFERRED EMBODIMENT

Figure 1:
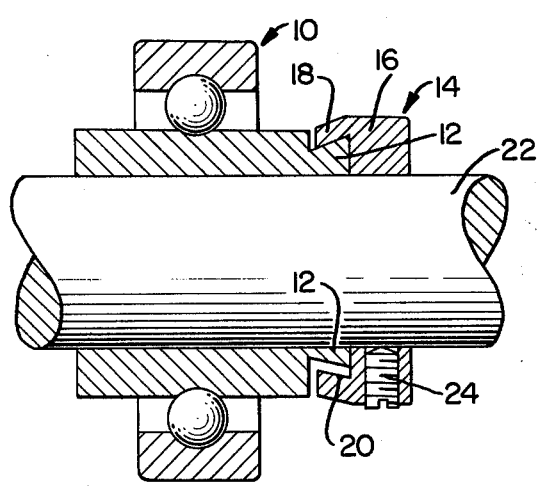
FIG. 1 is a view in cross-section of an antifriction bearing and locking collar mounted on a shaft.

FIG. 1 of the drawings shows in cross-section the general relationship between an antifriction bearing 10 with an external eccentric conical surface on an extension of the inner race member 12, a locking collar 14 made up of an annular body 16 and a counterbore 18 which is usually conical on its circumferential surface 20. The counterbore 18 may be eccentric to the annular body 16 as is the general practice in the state of the art, but it is not necessary. The shaft 22 is the mounting for the bearing 10 and the locking collar 14.

The eccentric conical surface on the bearing inner race extension 12 and the mating conical surface 20 of the locking collar 14 act to keep the bearing 10 and the locking collar 14 from separating axially when the two parts are in the locked position on the shaft 22. Locking is accomplished by rotating the locking collar 14 relatively to the eccentric extension of the inner ring 12 of the bearing 10. The relative rotation moves the locking collar 14 radially relative to the bearing 10 causing a shearing action on the shaft 22 between the annular body 16 of the locking collar 14 and the inner ring of the bearing 10. A set screw 24 in the locking collar 14 is tightened down on the shaft 22 to prevent the locking collar 14 from backing off from the locked position due to vibration.

Figure 2A:
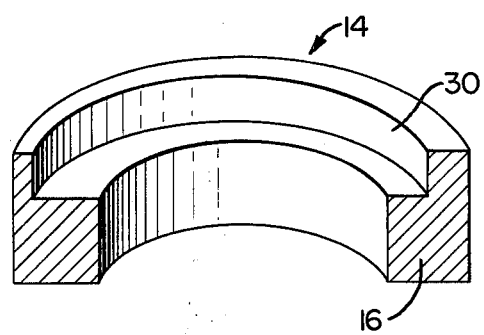
FIG. 2 (a) is a cross-sectional view with perspective of a locking collar with eccentric counterbore before forging the internal conical surface.
Figure 2B:
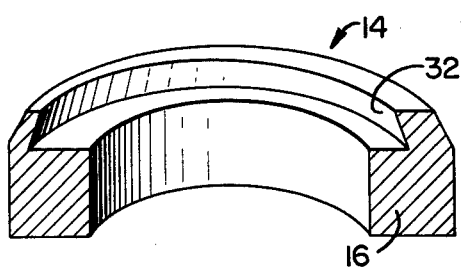

FIG. 2(a) shows the details of the locking collar 14 before the forging operation and FIG. 2(b) shows the locking collar 14 after the forging operation. It should be noted that the pre-forged counterbore in FIG. 2(a) has a circumferential side wall 30 which is parallel to the axis of the locking collar 14. According to the present invention, the locking collar 14 can be conventionally fabricated by several methods including turning, forging from wrought material or hot forging of powdered metal. The choice is one of which does the best job for the least expense. In the preferred embodiment, the locking collar is forged from stock that would otherwise be scrap from some other manufacturing process coincident with the manufacture of such bearings. With the present invention, the locking collar 14 may be totally made by a series of forging operations. The semi-finished part as shown in FIG. 2(a) is given a final forming operation by crimping the counterbore 18 as shown in FIG. 2(b) to produce the generally conical surface 20. This process will be afterwards described in detail.

FIG. 3 shows in cross-section, the general relationship of parts at the beginning of the final forging operation. The locking collar 14 as shown in FIG. 2(a) has the circumferential side wall 30 parallel to the axis of the locking collar 14. The knock-out and locator 40 is shown at its full up position, being held there by the ejection spring 42 which is loaded against the die base 44. The knock-out and locator 40 is restrained in this position by a shoulder 46 impinging against the edge of a hole 48 in the bottom of the die 50. The locking collar 14 is positioned by its bore on a positioning shoulder 52 of the knock-out and locator 40 without regard to the circumferential position of the eccentric counterbore. The punch 54 which is attached to the ram of the press (not shown) is in the raised position to permit loading the locking collar 14 on the positioning collar 52 with the counterbore 18 down so that it will enter die 50 with the help of the lead-in chamfer 56.

FIG. 4 shows in cross-section, the general relationship of parts in the final forging operation after the press is closed. The punch 54 has moved down contacting the annular body 16 of the locking collar 14, and pushing it downward into the die 50 with the inwardly angled sides 58 crimping the counterbore inwardly and forming the generally conical surface 20 as shown in FIG. 2(b). Forcing the locking collar 14 downward also moves the knock-out and locator 40 downward further compressing the ejection spring 42 against the die base 44 and disengaging the shoulder 46 from the shoulder of the hole 48.

As the press opens, the punch 54 returns to the up position as shown in FIG. 3. The ejection spring 42 is sufficient strength to move the knockout and locator 40 upward until the shoulder 46 again contacts the edge of the hole 48 in the die 50. In so doing, the locking collar 14 with the crimped-in counterbore is ejected from the die 50 to a position so that it can easily be removed from the knock-out and locator pin 40 which is then in position for positioning another locking collar at the start of a new cycle.

Figure 5:
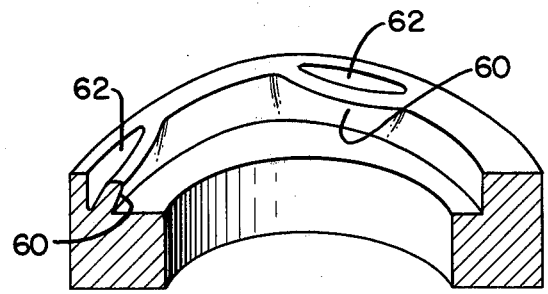
FIG. 5 is a cross-sectional view and perspective of a locking collar with eccentric counterbore forged with an interrupted internal conical surface by a staking operation in another embodiment of the invention.
Figure 6:
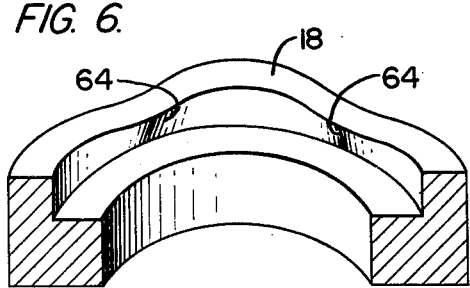
FIG. 6 is a cross-sectional view and perspective of a locking collar in which the bore and counterbore are concentric and the internal conical surface is interrupted in still another embodiment of the invention.

FIG. 5 and FIG. 6 are variations of the preferred embodiment and are particularly adaptable to locking collars of larger size where it is impractical to crimp in the whole counterbore because of the increase in energy required to forge the additional metal. An interrupted conical surface is perfectly acceptable on the locking collar because even with the full conical surface, contact of the extension of the inner race 12 by mating conical surface of locking collar is effected in only one linear area. The rest of the mating surfaces of the internal and external cones do not touch each other.

In FIG. 5, the interrupted internal conical surface is made at 60 by a staking operation. In this instance, the angularly inwardly confining sides 58 of die 50 are removed in favor of a continuation of the axial internal surface of the die. The functions of the angled surface 58 is then taken over by at least one chisel-shaped axial stake (not shown) protruding upward from the bottom of the die cavity. Such staking, which is well known in the forging art, produces the voids 62 by moving metal locally to produce the interrupted conical surfaces 60 around the circumference of the counterbore.

Figure 7:
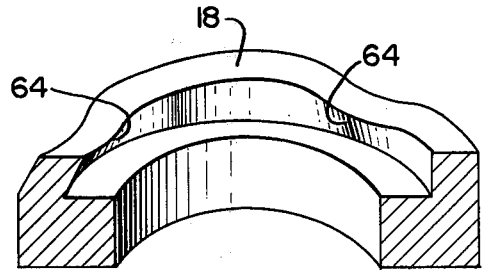
FIG. 7 is a cross sectional view and perspective of still another embodiment of the invention in which the bore and counterbore are eccentric and the internal conical surface is interrupted.
Figure 8:
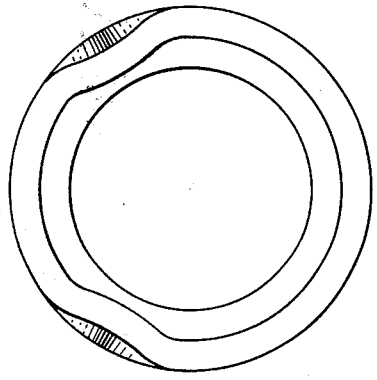
FIG. 8 is a plan view of the locking collar having the intermediary interrupted conical surface.

FIGS. 6 and 7 shown another embodiment of the localized forging as described above. In this instance, however, only part of the angularly confining sides 58 of the die 50 are removed. The section which is not removed forges or coins that part of the counterbore 18 inwardly to conform with the die as previously described. The remaining counterbore is unchanged. Where such coining or forging takes place, local generally internal conical surfaces 64 are produced on the counterbore.

While the invention has been described in connection with the preferred embodiments, it is not intended to limit the invention to the particular forms set forth above, but, on the contrary, it is intended to cover such alternatives, modifications, and equivalents as may be included within the spirit and scope of the present invention as defined by the appended claims.

What is claimed is:

1. A method for making an internal conical surface on the counterbore of an antifriction bearing locking collar in a press containing a die with a spring-loaded, knock-out and locating pin that is generally concentric with the axis of the die and protruding above the surface of the die comprising the steps of:

(a) placing the locking collar in the press with the counterbore side facing downwardly and positioned by the bore on the spring-loaded knock-out and locator pin of the die;

(b) closing the press on the locking collar to further compress the loading spring under the knock-out and locator pin by moving said pin and said collar axially downwardly and forcing the counterbore of said locking collar into inwardly angled and confining sides of said die to thereby deform the counterbore radially inwardly at least at preselected positions such that the deformed portion generally conforms with the internal configuration of corresponding portions of the confining sides of the die; and (c) opening said press allowing the compressed spring of the knock-out and locator pin to expand, pushing the pin upward and disengaging the locking collar from the die.

2. In a method of forming an internal conical surface on the counterbore of an antifriction bearing locking collar comprising the steps of forging a steel billet into a preform of a predetermined size by a blanking operation, punching the slug to form a ring, a second punching step wherein the hole in central about the axis of the ring is used as a guide to produce an eccentric counterbore on one side of the ring, the improvement comprising a final punching operation upsetting the metal around the counterbore to produce a reverse, generally conical internal surface which is eccentric to the bore and concentric with the counterbore.

3. A method of forming an internal conical surface on the counterbore of an annular antifriction bearing locking collar having a concentric bore along the major axis thereof comprising the steps of:

providing at one end of said collar a counterbore located eccentrically relative to the bore of said locking collar and having an internal circumferential side wall, concentrically deforming relative to the axis of said counterbore at least a portion of the periphery of the counterbore by forcing a corresponding portion of said internal circumferential side wall generally radially inwardly toward the major axis of said collar to thereby form the internal conical surface of the counterbore.

4. A method of forming an internal conical surface on the counterbore of an annular antifriction bearing locking collar having a concentric bore along the major axis thereof comprising the steps of:

providing at one end of said collar a counterbore located concentrically relative to the bore of said locking collar and having an internal circumferential side wall, concentrically deforming relative to the axis of said counterbore a limited portion only of the periphery of the counterbore by forcing a corresponding portion of said internal circumferential side wall generally radially inwardly toward the major axis of said collar to thereby form the internal conical surface of the counterbore.

5. The method as set forth in claim 3 wherein said deforming step deforms substantially the entire periphery of the counterbore.

6. The method as set forth in claim 3 wherein said step of deforming the periphery is done at intermittent intervals thereby forming an interrupted internal conical surface on the counterbore.

7. The method set forth in claim 6 wherein said step of deforming the periphery is performed by staking at least one portion of the axial end of the counterbore such that the deformed portion has a void formed therein.

8. The method as set forth in claim 5 wherein said deforming step is accomplished by forging.

9. The method as set forth in claim 8 wherein said forming step is performed by forging.

10. The method as set forth in claim 6 wherein said deforming step is performed by selectively forging portions of the counterbore.

* * * * *